Patented Aug. 8, 1944

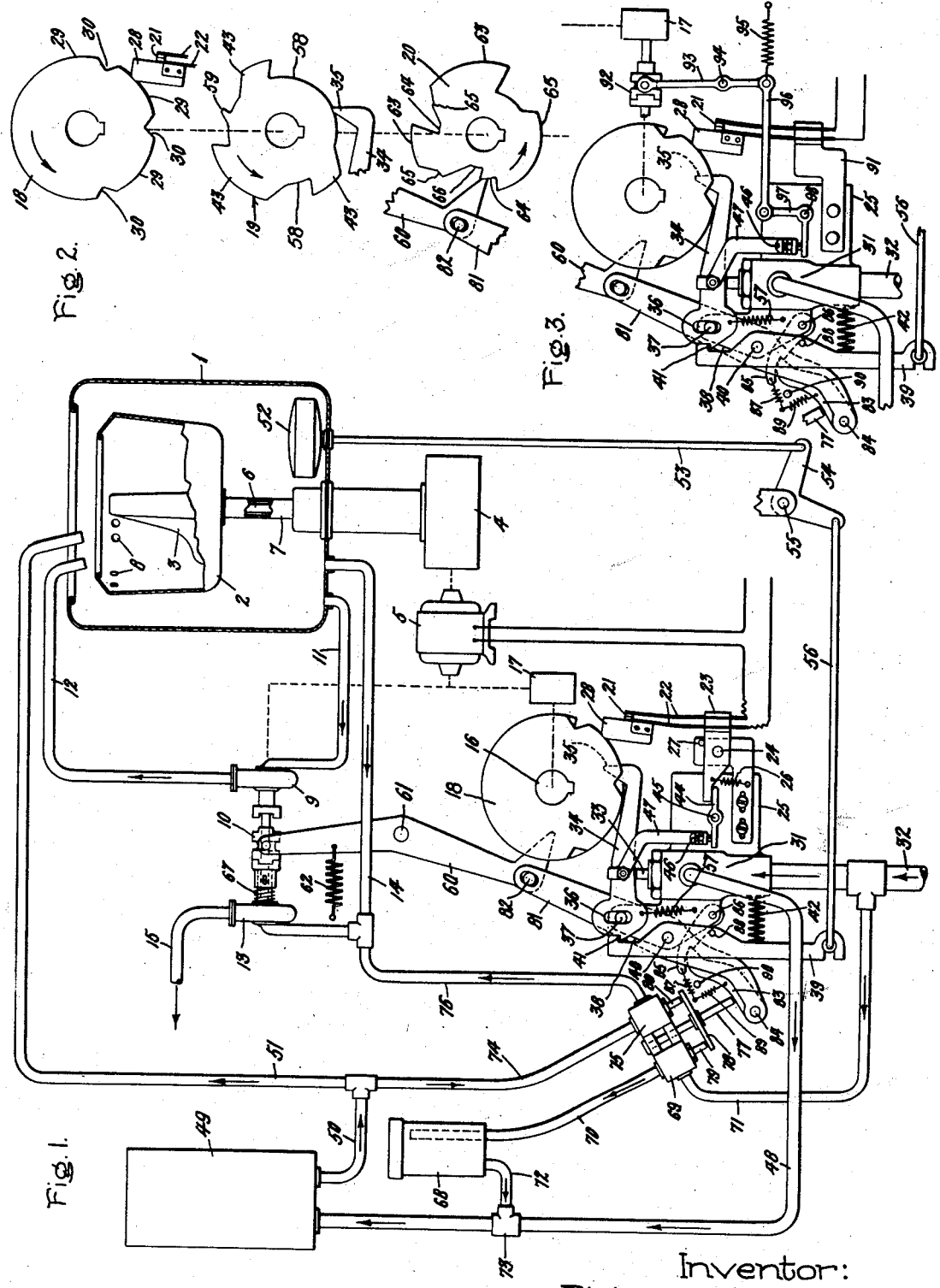

2,355,455

UNITED STATES PATENT OFFICE 2,355,455

WASHING MACHINE

Richard C. McPhilomy, Schenectady, N. Y., assignor to General Electric Company, a corporation of New York Application May 23, 1941, Serial No. 394,901

9 Claims. (Cl. 68—12)

The present invention relates to the control of the liquid supply for automatic washing machines.

The problem of automatically controlling the supply of liquid to automatic washing machines is complicated by the fact that either or both the power and liquid supply may fail for a period of time relatively long compared to the time required for the automatic cycle of operation of the machine and that the operator may not be present to notice such failure. It is therefore possible that upon failure of the water supply pressure the automatic washing operations may be carried out with insufficient water. It is also possible that upon failure of the power supply, the water supply may be left turned on and the machine filled to overflowing.

The object of my invention is to provide an improved control of the liquid supply for automatic washing machines which will not be affected by failure of the power or liquid supply. For a consideration of what I believe novel and by my invention, attention is directed to the following description and the claims appended thereto.

In the accompanying drawing, Fig. 1 is a diagrammatic view showing my control applied to an automatic washing machine; Fig. 2 is an exploded view of some of the control cams; and Fig. 3 is a fragmentary view of a modification.

Referring to the drawing, I have shown my invention applied to an automatic washing machine of the type shown in application Serial No. 391,113, filed April 30, 1941, to which reference may be made for further details of construction. It comprises an outer casing 1 in the upper part of which is located a rotatable clothes receptacle 2 within which is supported an oscillatory agitator 3. Below the outer casing is a gear casing 4 containing suitable mechanism driven by a motor 5 for selectively oscillating and rotating a shaft 6 extending up from the bottom of the outer casing through a sleeve 7. By suitable mechanism associated with the shaft 6 the agitator is either oscillated to wash the clothes within the receptacle or the receptacle is rotated at a high speed to centrifugally dry the clothes.

During washing, liquid overflows from the receptacle 2 to the outer casing 1 through openings 8 in the upper part of the receptacle. These openings serve as centrifugal discharge openings during centrifugal drying. The overflowing liquid is returned to the receptacle by a circulating pump 9 driven by the motor 5 through a clutch 10 and having its inlet connected by a conduit 11 to the bottom of the outer casing and having its outlet connected to a conduit 12 discharging into the top of the receptacle. The circulating pump preferably runs throughout the washing operation so as to maintain the proper liquid level in the receptacle. The clutch 10 also serves to drive a drain pump 13 having its inlet connected through a conduit 14 to the bottom of the outer casing and having its outlet connected to a conduit 15 leading to a drain. Since a single clutch is used to control both the drain and circulating pumps, simultaneous operation of the pumps is impossible.

The machine is controlled by a timing shaft 16 driven from the motor 5 through reduction gearing 17 and having keyed thereon a stack of cams for controlling the desired operations of the machine. The timing shaft may turn at any desired speed. In the present machine it turns at a speed of one revolution per hour. Since most of these operations are not pertinent to the present invention, only three of the cams are illustrated, a cam 18 for controlling the power supply, a cam 19 controlling the water supply, and a cam 20 controlling the pumps.

The power supply cam 18 controls a switch 21 connected in the power supply line for the motor. The switch comprises spring contact arms 22 carried on a supporting arm 23 pivoted at 24 on a bracket 25. The arm 23 is biased by a spring 26 against a stop 27 on the bracket 25, in which position a block 28 of insulating material secured to one of the spring contact arms cooperates with the cam 18. The switch contacts are held closed so long as the block 28 bears on the projecting sections 29 of the cam and are opened when the block 28 falls in one of the depressions 30.

The water supply cam 19 controls a valve 31 connected in a water supply conduit 32. The valve has an operating plunger 33, spring biased outwardly to the closed position, which cooperates with the intermediate portion of a lever 34 having one end 35 cooperating with the cam 19. The other end of the lever 34 has a slot 36 through which extends a pivot pin 37 on a bracket 38. A latch 39, pivoted at 40 on the bracket 38, is biased into engagement with a seat 41 on the lever 34 by a compression spring 42. So long as the latch 39 engages the seat 41, the lever 34 is in effect pivoted on the latch. When the end 35 of the lever 34 rides up on one of the projections 43 of the water supply cam 19, the lever 34 is pivoted in a clockwise direction and moves the plunger 33 inward opening the valve 31. This movement of the lever 34 opens the switch 21 through a lever 44 pivoted at 45 on the bracket 25 and having one end engaging the switch supporting arm 23 and the other end engaging a set screw 46 in the end of an arm 47 fixed to the lever 34. Through the parts 44 and 47, the downward movement of the lever 34 caused by the opening of the valve 31 pivots the switch supporting arm 23 in a clockwise direction, moving the block 28 clear of the switch cam 18 and permitting separation of the switch contacts. This opens the power supply to the motor 5 and accordingly stops the cams which are driven by the motor. Since the cams are stopped, the supplying of water is independent of the power supply.

Upon opening the valve 31, water flows through the valve to a conduit 48 connected to a water softener 49 and from the water softener through conduits 50 and 51 to the receptacle 2. When the receptacle is full, it overflows through openings 3, and the overflow is caught in the bottom of the outer casing 1. For satisfactory operation of the circulating pump 9, there should be a small amount of water in the bottom of the outer casing. This amount is sufficient to raise a float 52 connected by a link 53 to one arm of a bell crank lever 54 pivoted at 55. The other arm of the bell crank lever is connected by a link 56 to the lower end of the latch 39. The raising of the float acts through the bell crank lever and associated linkage to move the latch 39 clear of the lever 34. The valve 31 is then closed by its spring bias, the plunger 33 moving outward. The upward movement of the lever 34, upon tripping of the latch 39, raises the arm 47 and permits closure of the switch 21 to start the cams. The lever 34 is held in engagement with the plunger by a relatively weak biasing spring 57. When the end 35 of the lever 34 moves into one of the depressions 58 in the cam 19, the seat 41 of the lever 34 is moved by the spring 57 into engagement with the latch 39, resetting the latch. As explained in detail in the aforesaid application Serial No. 391,113, the washing operation takes place while the lever 35 rests on projections 43 and centrifugal drying takes place while the lever rests in depressions 58.

The foregoing arrangement for automatically supplying water to the machine is independent of failure of either the power or the water supply. It is independent of the power supply since the timer drive for the automatic control cams is interrupted at the initiation of the automatic supplying of water to the machine. It is independent of the water supply since the closing of the valve is dependent upon the amount of water supplied to the machine rather than upon the length of time required to supply the water.

Under some conditions it is desirable to supply a small amount of water to the machine, for example, for flushing soapy water from the clothes as a preliminary to rinsing. In the present machine this is provided for by a projection 59 on the water supply cam which cooperates with the lever 34 to hold the valve 31 open for a short time. The water flowing into the receptacle during this time is only sufficient to partially fill the receptacle. The movement of the lever 34 is not sufficient to open the switch 21 so the timer drive for the cams is not interrupted. If the power supply failed while the lever 34 was on the projection 59, the water supply would continue until the latch 39 was tripped by the float 52. This would waste some water, since more water than necessary would have been supplied, but the water would be shut off before the machine overflowed. If the water supply failed, less water would be supplied than desirable for the flush rinse. This is not serious since the cycle of operation of the machine includes other rinsing operations.

The pump control cam 20 controls the drain and circulating pumps through a lever 60 pivoted at 61 and having one end connected to the clutch and the other end cooperating with the pump control cam. The lever is held in engagement with the cam by a tension spring 62. When the lever cooperates with projections 63, the clutch 10 is moved into engagement with the circulating pump 9. When the lever is in depressions 64, the clutch is moved into engagement with the drain pump 13. Cam sections 65 are the neutral positions in which neither the drain nor the circulating pumps are running.

The pump control cam has a deeper depression 66 which is used to control the regeneration or reconditioning of the water softener 49. When the lever 60 falls into the depression 66, the clutch 10 is moved still further to the left, this movement being permitted by a spring 67. The drain pump accordingly continues in operation. The water softener is regenerated by supplying a small amount of salt water which is obtained from a salt box 68 having its inlet connected to the water supply line 32 through a valve 69 and conduits 70 and 71. The outlet from the salt box is connected by a conduit 72 to a T-fitting 73 in the conduit 48. It is undesirable that the salt water flowing through the water softener be conducted to the receptacle 2. There is accordingly provided an alternative passage for this salt water which comprises a conduit 74 connected to the outlet conduit 50 of the water softener, a valve 75, and a conduit 76 connected to the drain conduit 14. The valves 69 and 75 are spring biased to the closed position and are controlled by a common plunger 77 having a plate 78 cooperating with the respective valve plungers 79 and 80. Whenever the plunger 77 is depressed, the valves 69 and 75 are opened. This permits water to flow from the water supply line to the salt box and from the water softener to the drain pump. The conduit 51 leading to the receptacle is open, but, since it extends into the upper part of the outer casing, no water will flow through this conduit. The depression of the plunger 77 is controlled by a lever 81 pivoted at 40 on the bracket 38 and having a pin or slot connection 82 with the pump control lever 60. The lever 81 cooperates with the plunger 77 through a lever 83 pivoted at 84 on the lever 81 and held in the position illustrated by a latch 85 pivoted at 86 on the bracket 38. Under normal conditions the latch 85 is held against the lever 83 by a spring 87. If the power supply should fail while the water softener is being regenerated, the salt water would flow from the water softener through the conduit 14 to the bottom of the outer casing and, when sufficient water had accumulated to raise the float 52, the latch 39 would be pivoted in a counter-clockwise direction about the pivot pin 40, as described above. Under this condition a pin 88 on the latch 39 engages the latch 85 and moves the latch clear of the lever 83. The lever 83 is no longer effective to hold the valves 69 and 75 open, and these valves are accordingly closed under their spring bias. The necessary outward movement of the valve operating plungers 79 and 80 is permitted by movement of the lever 83 relative to the lever 81. Upon failure of the power supply during regeneration of the water softener, the machine is accordingly protected from flooding since after the failure of the power supply only the amount of water necessary to raise the float 52 can flow through the water softener. The failure of the water supply during regeneration of the water softener will result in the supplying of an insufficient amount of water for complete regeneration. This, however, is not serious since it is intended that the water softener be regenerated after each use of the machine and the operation of the softener is not adversely affected on occasional incomplete regeneration. After the latch 85 is tripped due to failure of the power supply, the latch is reset upon movement of the pump control lever 60 onto one of the projections 63. In this position the lever 83 is held by a tension spring 89 against a stop 90, in which position the latch 85 is moved into latching engagement with the lever 83 by the spring 87.

The modification shown in Fig. 3 differs from the previously described construction in that the drive to the timing shaft 16 is interrupted mechanically rather than electrically during the automatic filling of the washing machine. In this construction the switch 21 is supported on a fixed arm 91 supported on the bracket 25. The timing shaft 16 is driven from the reduction gearing 17 through a clutch 92 controlled by a shifting lever 93 pivoted at 94 and biased to the clutch engaging position by a spring 95. The shifting lever 93 is connected by a link 96 to a bell crank lever 97 pivoted at 98 on the bracket 25. Upon downward movement of the arm 47 which accompanies the movement of the lever 34 to the position opening the valve 31, the set screw 46 at the lower end of the arm 47 exerts a force on the bell crank lever 97 turning it in a counter-clockwise direction, moving the clutch 92 to the disengaged position and stopping or interrupting the timing shaft 16. Upon closure of the valve 31, the arm 47 is raised and the clutch 92 is returned to the engaged position by the spring 95. In other respects the operation of the modification is the same as the previously described construction.

What I claim as new and desire to secure by Letters Patent of the United States is:

1. In a washing machine of the type having a casing and a rotatable receptacle for receiving clothes to be washed and centrifugally dried, said receptacle being constructed to hold liquid during washing and to overflow to the casing, a water softener, a salt box, a water supply conduit leading through the water softener to the receptacle, an alternative water supply conduit leading through the salt box and the water softener to the casing, means responsive to the water level in the casing for shutting off said water supply conduits, a pump for withdrawing water from the casing, and a control for selectively opening the water supply conduits, said control causing the pump to run upon opening the conduit through the salt box.

2. In a washing machine of the type having a casing and a rotatable receptacle for receiving clothes to be washed and centrifugally dried, said receptacle being constructed to hold liquid during washing and to oxerflow to the casing, a water softener, a salt box, a water supply conduit leading through the water softener to the receptacle, an alternative water supply conduit leading through the salt box and the water softener to the casing, means responsive to the water level in the casing for shutting off said water supply conduits, power operated means for draining water from the casing, and a control for selectively opening the water supply conduits, said control causing the draining of water from the casing upon opening the conduit through the salt box.

3. In a washing machine, a water softener, a salt box, a water supply conduit leading through the salt box and the water softener to the machine, means responsive to the water level in the machine for shutting off said water supply conduit, power operated means for draining water from the machine, and a control for opening said water supply conduit and causing operation of said draining means.

4. In an automatic washing machine, a control for a sequence of operations including the supply of water to the machine, a timer drive for said control, a member movable to a position starting the supply of water to the machine and stopping the timer drive and biased away from said position, said member being movable to said position by said control, provisions for releasably holding said member in said position including tripping mechanism effective upon actuation to release said member, and means responsive to the liquid level in the machine for actuating said tripping mechanism.

5. A washing machine for performing a sequence of operations including the supply of water to the machine, a water softener for conditioning water supplied to the machine, a regenerative circuit for the water softener including a salt box and provisions for conducting water through the salt box and water softener to the machine and for draining the machine, a control movable to a position causing the flow of water through said regenerative circuit and operation of the drain for the machine, said control being biased from said position, provisions for releasably holding said control in said position including tripping means effective upon actuation to release said control, and means responsive to the liquid level in the machine for actuating said tripping means whereby flooding of the machine is prevented upon failure of the provisions for draining the machine.

6. In an automatic washing machine, a casing, a receptacle therein for holding water and clothes to be washed, said receptacle discharging to the casing, a water softener, a supply circuit for the receptacle leading through the water softener, a regenerating circuit leading through the water softener to the casing, means for selectively pumping water from the casing to the receptacle and to a drain, a sequential control for the machine, a timer drive for the control, control means movable by said control to a position starting the flow of water through the supply circuit and causing the pumping of water from the casing to the receptacle and the interruption of the timer drive, control means movable by the control to a position starting the flow of water through the regenerating circuit and causing the pumping of water from the casing to a drain, provisions for releasably holding said control means in said positions, and means responsive to the liquid level in the casing for actuating said holding means to release said control means.

7. In an automatic washing machine, a casing, a receptacle therein for holding water and clothes to be washed, said receptacle discharging to the casing, a water softener, a water supply circuit for the receptacle leading through the water softener, a regenerating circuit for the water softener leading through the water softener to the casing, means for selectively pumping water from the casing to the receptacle and to a drain, control means for starting the flow of water through said supply circuit and causing the pumping of water from the casing to the receptacle, control means for starting the flow of water through the regenerating circuit and causing the pumping of water from the casing to a drain, and means responsive to a predetermined amount of water in the casing for stopping the flow through said regenerative and supply circuits.

8. In an automatic washing machine of the type having a casing, a rotatable receptacle for receiving clothes to be washed and centrifugally dried, said receptacle being constructed to hold liquid to a predetermined level during washing and to overflow to the casing, and means for pumping liquid from the casing to the receptacle, a control for a sequence of operations including the supply of water to the machine, a timer drive for said control, said control in the water supplying position starting the supply of water to the machine and stopping the timer drive and causing the pumping of liquid from the casing to the receptacle, and means responsive to a predetermined accumulation of liquid in the casing for stopping the water supply and starting the timer drive.

9. In an automatic washing machine of the type having a casing, a rotatable receptacle for receiving clothes to be washed and centrifugally dried, said receptacle being constructed to hold liquid to a predetermined level during washing and to overflow to the casing, and means for pumping liquid from the casing to the receptacle, mechanism for effecting washing and for rotating the receptacle for centrifugal drying, and a motor for driving the mechanism, a control for a sequence of washing and drying operations including the supply of water to the machine, said control in the water supplying position having means starting the supply of water to the machine and interrupting the circuit to said motor and causing the pumping of liquid from the casing to the receptacle, and means responsive to a predetermined accumulation of liquid in the casing for stopping the water supply and establishing the circuit to said motor.

RICHARD C. McPHILOMY.